United States Patent
Skijus et al.

(10) Patent No.: US 8,714,570 B2
(45) Date of Patent: May 6, 2014

(54) QUICK-DISCONNECT HANDLE FOR LIFTING AND DUMPING OF WHEELBARROW CART

(75) Inventors: John Skijus, Franklin Square, NY (US); Thomas Berinato, Lynbrook, NY (US)

(73) Assignee: Stable Innovations Ltd, Franklin Square, NY (US)

( * ) Notice: Subject to any disclaimer, the term of this patent is extended or adjusted under 35 U.S.C. 154(b) by 144 days.

(21) Appl. No.: 13/317,337

(22) Filed: Oct. 14, 2011

(65) Prior Publication Data

US 2012/0181762 A1 Jul. 19, 2012

(51) Int. Cl.
*B62B 1/20* (2006.01)
*B62B 1/22* (2006.01)
*B60N 3/02* (2006.01)

(52) U.S. Cl.
CPC .. *B62B 1/20* (2013.01); *B60N 3/026* (2013.01)
USPC ......................................... 280/47.31; 16/422

(58) Field of Classification Search
CPC ............ B25G 3/32; B60N 3/026; B62B 1/18; B62B 1/20; B62B 1/22
USPC ............ 220/759; 296/1.02; 16/406, 408, 411, 16/413, 422, 426, 427, 429, 436, 437, 16/DIG. 24, DIG. 25
See application file for complete search history.

(56) References Cited

U.S. PATENT DOCUMENTS

| | | | |
|---|---|---|---|
| 1,246,587 A * | 11/1917 | Giardino | 294/169 |
| 1,325,557 A | 12/1919 | Cummins | |
| 1,513,469 A | 10/1924 | Robinson | |
| 1,815,244 A | 7/1931 | Dodge | |
| 2,243,794 A * | 5/1941 | Dunn | 4/576.1 |
| 2,350,062 A | 5/1944 | Mosier | |
| 2,494,144 A | 1/1950 | Restall | |
| 2,553,334 A | 5/1951 | Schmidt | |
| 2,736,904 A * | 3/1956 | Suggs | 4/577.1 |
| 2,807,029 A * | 9/1957 | Armstrong | 4/577.1 |
| 2,872,202 A | 2/1959 | Tripoli | |
| 2,902,286 A | 9/1959 | Wood, Jr. | |
| 2,938,748 A | 5/1960 | Johnson | |
| 3,188,109 A | 6/1965 | Broadrick | |
| 3,236,537 A | 2/1966 | Eckman | |
| 3,414,910 A * | 12/1968 | Provi et al. | 4/577.1 |
| 3,463,504 A | 8/1969 | Petry et al. | |
| 3,679,227 A | 7/1972 | Rock | |
| 3,751,058 A | 8/1973 | Larsen | |
| 3,894,753 A | 7/1975 | Ickes | |

(Continued)

FOREIGN PATENT DOCUMENTS

GB 2135249 A * 8/1984 ............... B62B 1/20
WO 2011001958 12/2011

*Primary Examiner* — Hau Phan
*Assistant Examiner* — Jacob Meyer
(74) *Attorney, Agent, or Firm* — Alfred M. Walker

(57) ABSTRACT

A second quick-disconnect wide handle is attached to the front of a stable wheelbarrow cart to enable two persons to quickly lift and dump the contents of a full wheelbarrow cart into a dumpster or walled compost bin. This accessory handle is easily removed when not in use. The handle has other uses such as moving plywood panels or table-tops, doors, or other large flat items. The quick-disconnect feature uses a quick disconnect clamp with the addition of an elongated handle and attachment of a rod attachment to it; whereby one such clamp is used at each rod end attaching the handle to the bin of the wheelbarrow cart.

4 Claims, 3 Drawing Sheets

(56) References Cited

U.S. PATENT DOCUMENTS

| | | | |
|---|---|---|---|
| 3,913,762 A | 10/1975 | Alexander | |
| 3,927,812 A * | 12/1975 | Winters et al. | 220/759 |
| 3,936,070 A | 2/1976 | Owings | |
| 4,164,300 A * | 8/1979 | Raczynski et al. | 220/318 |
| 4,194,654 A | 3/1980 | Badger | |
| 4,199,161 A | 4/1980 | Nieminen et al. | |
| 4,223,907 A | 9/1980 | Kelly | |
| 4,253,677 A | 3/1981 | Wissler | |
| 4,261,596 A | 4/1981 | Douglas | |
| 4,266,791 A | 5/1981 | Myers | |
| 4,274,649 A | 6/1981 | Vanderhorst et al. | |
| 4,316,615 A | 2/1982 | Willette | |
| 4,375,113 A | 3/1983 | Ewert | |
| 4,488,733 A * | 12/1984 | Hellsten | 280/47.16 |
| 4,645,225 A | 2/1987 | Eubanks | |
| 4,658,467 A * | 4/1987 | Stolarz | 16/114.1 |
| 4,783,090 A | 11/1988 | Moulton | |
| 4,789,171 A | 12/1988 | Porter | |
| 4,789,180 A | 12/1988 | Bell | |
| 4,825,505 A | 5/1989 | Witte | |
| 4,846,427 A | 7/1989 | Jones | |
| 4,872,697 A * | 10/1989 | Berkowitz | 280/304.5 |
| 4,873,841 A | 10/1989 | Bradshaw et al. | |
| 4,889,360 A | 12/1989 | Havlovitz | |
| 4,912,808 A * | 4/1990 | Blakely | 16/422 |
| 4,922,576 A * | 5/1990 | Weidner et al. | 16/413 |
| 4,957,306 A | 9/1990 | Greenberg | |
| 4,958,846 A | 9/1990 | Greenberg | |
| 5,005,255 A * | 4/1991 | Pare et al. | 16/429 |
| 5,008,974 A * | 4/1991 | Eilert et al. | 16/406 |
| 5,022,137 A * | 6/1991 | Sorensen et al. | 29/559 |
| 5,116,289 A | 5/1992 | Pond et al. | |
| 5,149,116 A | 9/1992 | Donze et al. | |
| 5,163,694 A | 11/1992 | Reichek | |
| 5,208,942 A * | 5/1993 | Simon | 16/429 |
| 5,209,051 A * | 5/1993 | Langdon | 56/16.7 |
| 5,263,727 A | 11/1993 | Libit et al. | |
| 5,277,449 A | 1/1994 | Schmidt | |
| 5,290,055 A * | 3/1994 | Treat, Jr. | 280/304.1 |
| 5,318,315 A | 6/1994 | White et al. | |
| 5,330,212 A | 7/1994 | Gardner | |
| D351,700 S | 10/1994 | Uzelman | |
| 5,374,095 A | 12/1994 | Ramseth | |
| D362,100 S | 9/1995 | McMurdo | |
| 5,461,755 A | 10/1995 | Hardigg et al. | |
| 5,511,285 A * | 4/1996 | Bush et al. | 16/422 |
| 5,593,147 A * | 1/1997 | Read | 269/170 |
| 5,692,761 A | 12/1997 | Havlovitz | |
| 5,791,006 A * | 8/1998 | Anctil | 15/144.4 |
| 5,803,472 A | 9/1998 | Lien | |
| 5,806,866 A | 9/1998 | Fleischer | |
| 5,820,141 A | 10/1998 | Wilkerson et al. | |
| 5,884,924 A | 3/1999 | Fairchild et al. | |
| 5,909,758 A * | 6/1999 | Kitamura | 16/406 |
| 5,915,712 A * | 6/1999 | Stephenson et al. | 280/304.1 |
| 5,934,425 A * | 8/1999 | Sadow | 190/115 |
| 5,957,352 A * | 9/1999 | Gares | 224/401 |
| 5,983,455 A * | 11/1999 | Polzin et al. | 16/429 |
| 6,003,202 A * | 12/1999 | Dauterive | 16/429 |
| 6,098,492 A * | 8/2000 | Juchniewicz et al. | 74/551.3 |
| 6,139,029 A | 10/2000 | Shaw | |
| 6,154,929 A * | 12/2000 | Dwyer | 16/422 |
| 6,264,184 B1 * | 7/2001 | Armstrong et al. | 269/17 |
| 6,347,791 B1 * | 2/2002 | Chervenak | 269/6 |
| 6,360,402 B1 * | 3/2002 | Crabtree | 16/430 |
| 6,382,608 B1 * | 5/2002 | Michell | 269/6 |
| 6,389,645 B1 * | 5/2002 | Polidoro | 16/405 |
| 6,499,193 B1 | 12/2002 | Robert | |
| 6,554,301 B2 | 4/2003 | Scott et al. | |
| 6,561,529 B2 | 5/2003 | Darling, III | |
| 6,964,421 B2 | 11/2005 | Friel | |
| D543,083 S * | 5/2007 | Weinberg et al. | D8/72 |
| 7,240,403 B1 * | 7/2007 | Richardson | 16/425 |
| 7,571,517 B2 | 8/2009 | Smith et al. | |
| 7,603,728 B2 * | 10/2009 | Roth | 4/577.1 |
| 7,641,204 B2 | 1/2010 | Rye et al. | |
| 7,850,176 B2 | 12/2010 | Hill | |
| 7,866,686 B2 | 1/2011 | Conaway et al. | |
| 7,934,727 B1 * | 5/2011 | Parry | 280/47.18 |
| 8,002,510 B2 * | 8/2011 | Williams | 414/10 |
| 8,234,755 B1 * | 8/2012 | Brand et al. | 16/427 |
| 8,312,598 B2 * | 11/2012 | Palmer | 16/422 |
| 8,407,861 B1 * | 4/2013 | Brand et al. | 16/427 |
| 2001/0047569 A1 * | 12/2001 | Cacciacarne | 16/426 |
| 2003/0223848 A1 * | 12/2003 | Clingan | 414/444 |
| 2004/0154131 A1 * | 8/2004 | Earley et al. | 16/406 |
| 2005/0062245 A1 | 3/2005 | Tomchak et al. | |
| 2005/0138750 A1 * | 6/2005 | Trincilla et al. | 15/236.03 |
| 2005/0257346 A1 * | 11/2005 | Roth | 16/436 |
| 2006/0049563 A1 * | 3/2006 | Kloepfer et al. | 269/6 |
| 2007/0114765 A1 | 5/2007 | Leger et al. | |
| 2009/0045196 A1 * | 2/2009 | Lee et al. | 220/212.5 |
| 2009/0111661 A1 | 4/2009 | Hauser et al. | 482/40 |
| 2010/0194066 A1 * | 8/2010 | Martin | 280/47.315 |
| 2010/0197471 A1 * | 8/2010 | Hayes et al. | 482/140 |
| 2011/0083481 A1 * | 4/2011 | Cheatham | 70/258 |
| 2011/0097136 A1 * | 4/2011 | Roman | 401/261 |
| 2011/0173778 A1 * | 7/2011 | Wales | 16/426 |
| 2012/0130376 A1 * | 5/2012 | Loring et al. | 606/80 |
| 2012/0222269 A1 * | 9/2012 | Anderson | 16/422 |
| 2013/0133158 A1 * | 5/2013 | Tran | 16/422 |

* cited by examiner

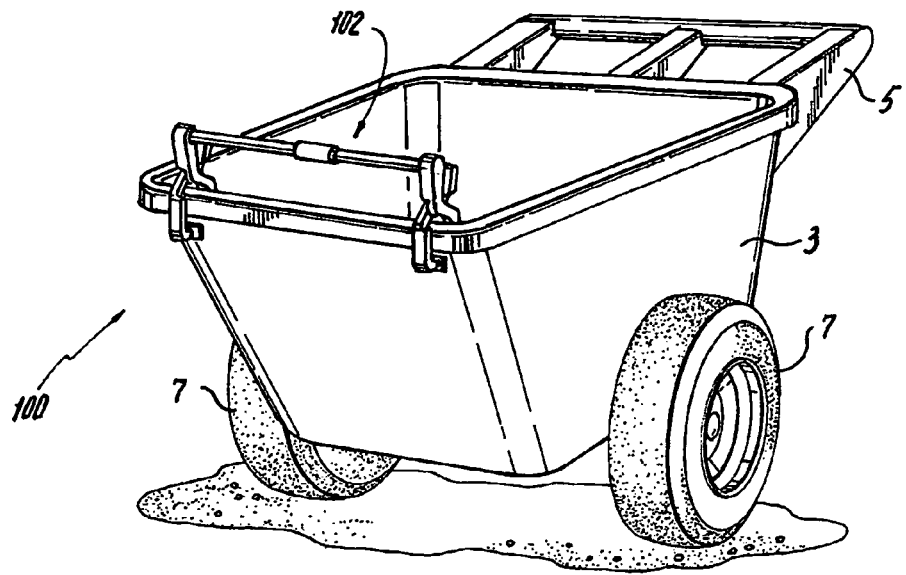
Fig. 1
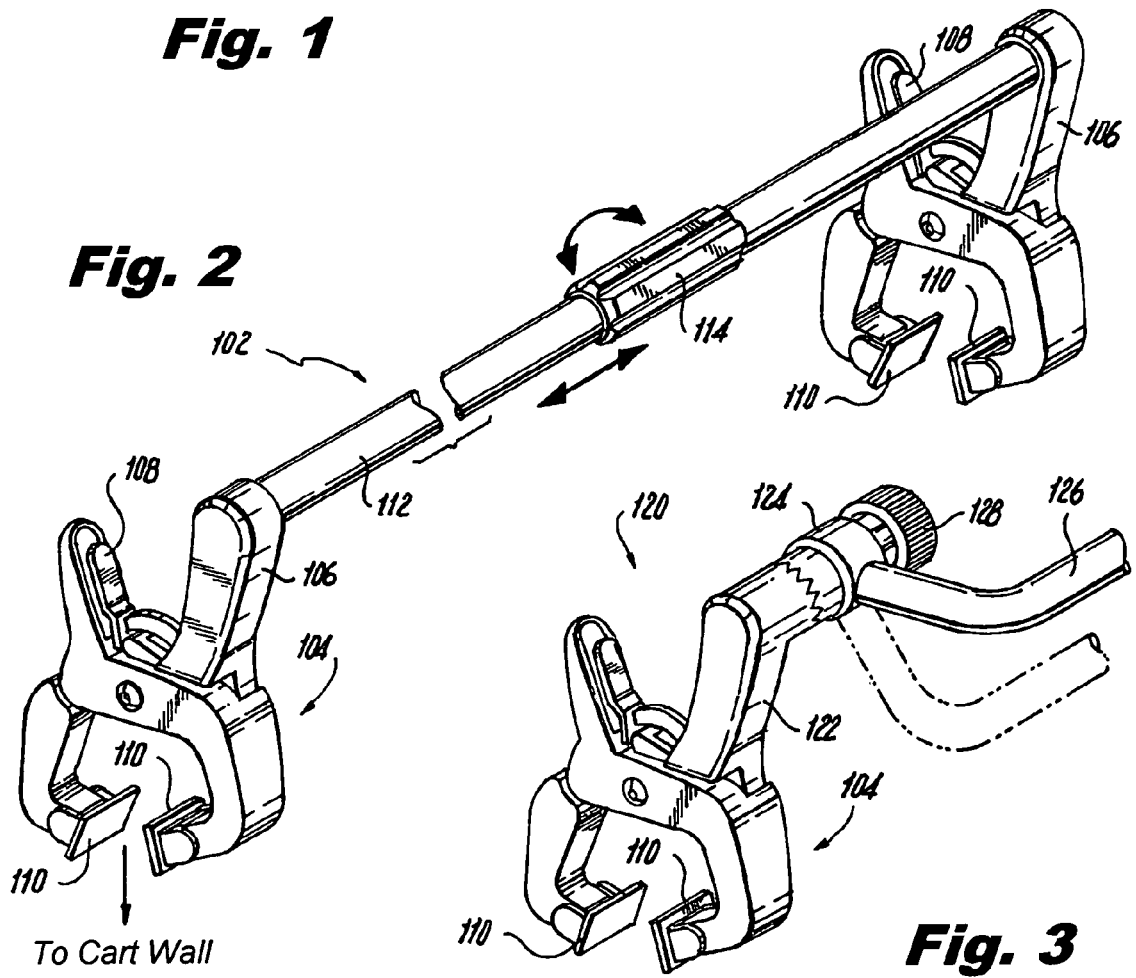
Fig. 2
Fig. 3

000
QUICK-DISCONNECT HANDLE FOR LIFTING AND DUMPING OF WHEELBARROW CART

FIELD OF THE INVENTION

The present invention relates to quick disconnect handles for dual handled liftable wheelbarrows and other objects.

BACKGROUND OF THE INVENTION

Carts and wheelbarrows are well represented in the prior art. Some carts are general purpose, while others are designed for a specific use. Wheelbarrows are used commonly both on the farm as well as the construction site. A stable for the use of horses requires frequent cleaning and moving of used straw from the stalls to a dumping area which can be a dumpster with high sides. Carts with two wheels and a deep bin are often used. Wheelbarrows with one wheel are also used at times for the same purpose to move the used straw. Since the carts and wheelbarrows for stall cleaning service must be emptied in an efficient manner, an auxiliary handle mounted to the bin portion opposite the primary handle or handles is an effective aid in this task.

U.S. Pat. No. 2,350,062 of Mosier shows a four wheel cart with small wheels, a low bin portion, and a front pivoted steering arrangement for the two front wheels. Besides a rod-mounted front pulling handle, a second pushing handle is mounted to the bin at the rear.

U.S. Pat. No. 4,223,907 of Kelly reveals a separable mortar cart with two attached separate deep bins and a total of six wheels. The intent is to transport a large amount of material substantially filling both bins from a supply point to a distribution point in a unitary configuration by a single worker pushing on either of the handles attached to opposite ends of the composite cart rolling on four large wheels. Upon reaching a distributing point, the cart is separated and each half is handled by one worker using two large wheels and a third smaller wheel that is now permitted to touch the ground. In this manner, the lower weight of one bin would be easily supported by scaffolding. These are heavy duty carts which are not designed for lifting in either separated or unitary configurations by the single or two handles respectively.

U.S. Pat. No. 6,139,029 of Shaw relates to a portable two-wheeled utility cart with high handles placed at two opposite sides. Besides these high handles extending from the bin ends, a carrying handle or grip is centrally attached to the upper margin of each of the bin ends to lift the cart or to maneuver it into a motor vehicle. With a lower bin and high handles, this cart is unwieldy to tip sideways. The short centrally mounted grips limit the dumping torque that can be applied to the cart.

SUMMARY OF THE INVENTION

In this invention a second quick-disconnect wide handle is attached to the front of a stable wheelbarrow cart to enable two users to quickly lift and dump a full wheelbarrow cart into a raised collection receptacle, such as a dumpster or compost container. This accessory handle is easily removed when not in use. The handle has other uses such as moving plywood panels or table-tops, doors, or other large flat items. The quick-disconnect feature is based on a modification of the well-known QUICK-GRIP® clamp under the IRWIN® brand of Irwin Industrial Tool Company. These quick disconnect clamps feature a ratcheting mechanism which reduces hand force to achieve high clamping pressure; they also include a quick-release lever. The modification involves elongating one handle and attaching a rod attachment to it; one such clamp is used at each rod end attaching the handle to the bin of the wheelbarrow cart.

Two embodiments are presented. The first embodiment is a fixed position handle with a width adjustment. The second embodiment adds an adjustment for rotating the grasped section to adjust its height when mounted to the cart.

BRIEF DESCRIPTION OF THE DRAWINGS

The present invention can best be understood in connection with the accompanying drawings. It is noted that the invention is not limited to the precise embodiments shown in drawings, in which:

FIG. 1 is a perspective view of a stable wheelbarrow cart with a quick-disconnect accessory front handle mounted.

FIG. 2 is a perspective view of one embodiment of the quick-disconnect handle of this invention.

FIG. 3 is a perspective detail of the second embodiment of quick-disconnect feature showing the height adjustment feature.

DETAILED DESCRIPTION OF THE INVENTION

Figure 4:
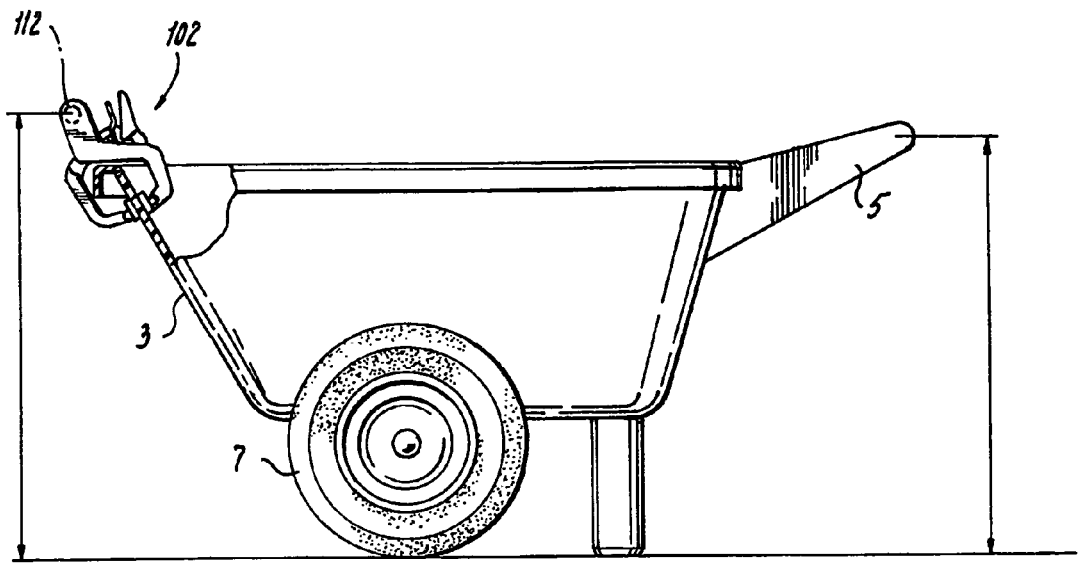
FIG. 4 shows the matching heights of the mounted quick-disconnect handle and the original pushing handle of the wheelbarrow cart.

FIG. 1 shows stable wheelbarrow cart 100 with molded rear handle 5, bin 3, and wheels 7. A quick-disconnect handle 102 is shown attached at the front top of bin 3.

FIG. 2 shows various parts of the accessory handle 102. This first embodiment has one modified quick connect/disconnect Irwin type clamp 104 at each end of handle rod 112. Handle rod 112 is in two parts attached with a twist-lock sleeve 114 at its center to facilitate length adjustment. Each clamp 104 has one elongated operating handle 106 with a rod attachment at it's distal end. Quick release levers 108 will release clamping pads 110 from wheelbarrow cart bin 3 surface upon squeezing.

FIG. 3 shows the modifications for the second embodiment 120 which permits height adjustment by virtue of the right angle rod extension 126 which can be rotated up or down. Note that elongated handle of each of the clamps 122 ends in a fixed ratchet member. A matching rotatable ratchet member 124 is attached to each end of handle 126; this can be locked in any position of rotation via locking knob 128.

FIG. 4 illustrates the matching heights of quick-disconnect handle 102 and molded rear handle 5 for ease in lifting and dumping.

Figure 5:
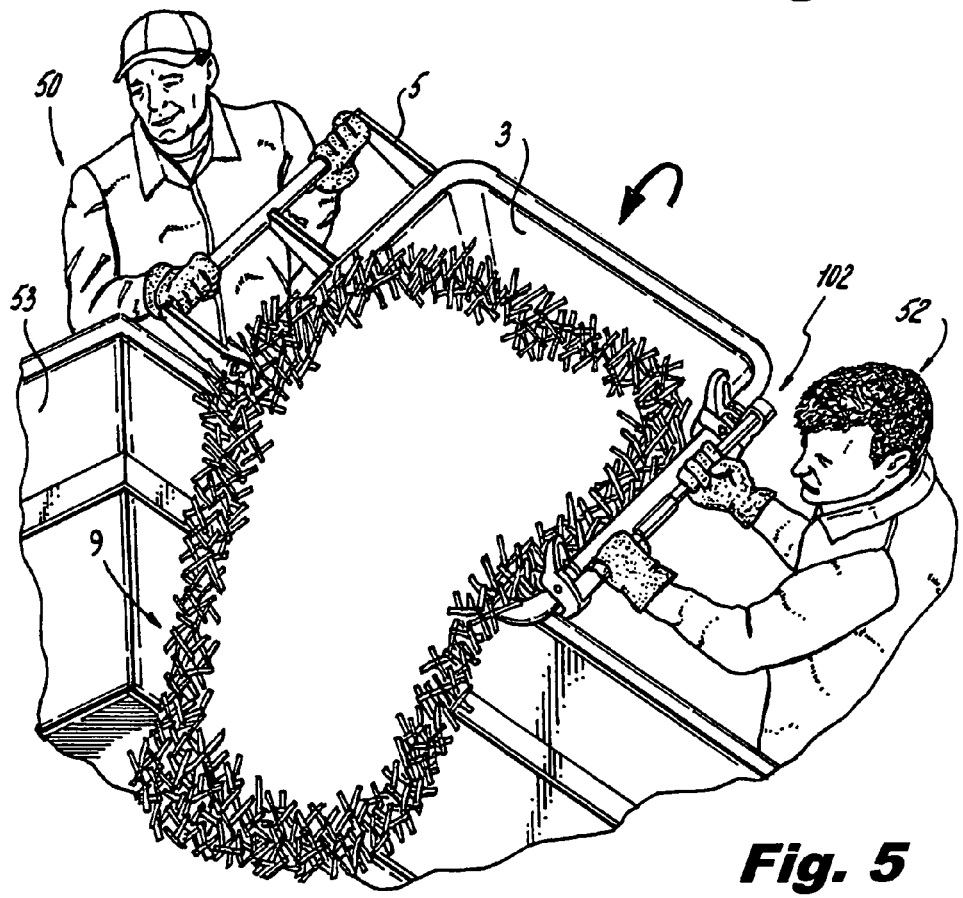
FIG. 5 is a perspective view of two grooms dumping a wheelbarrow cart full of used straw into a dumpster wherein the stable wheelbarrow cart is fitted with a quick-disconnect handle.

FIG. 5 shows groom 50 grasping the rear handle 5 while groom 52 grasps handle 102 as used straw is dumped into dumpster 53. FIG. 5 also illustrates the equal height of the rear pushing handle 5 and the grip 112 of handle assembly 102 when handle 102 is at its deployed lifting height. It is this equal height at the level close to the top of bin 3 that is most useful for lifting and dumping. This height also enables the users, such as two grooms 50, 52 at a racetrack, to have the respective handles 5 and 102 at equal chest height when the biceps are strongest at an ergonomic right angle, when tipping the contents 9 of the wheelbarrow cart 100 into a dumpster 53. If the handles 5 and 102 were much higher than the top of the bin 3 of the wheelbarrow cart, then the users would have to uncomfortably extend the users' arms over the users' respective head areas, so that the top of the bin 3 was at the height level of the top of the raised collection receptacle, such as dumpster 53. By equalizing the height of the front and rear handles, this adds to user safety, because it enables the two lifters to lift the wheelbarrow 100 under equal lifting forces, thereby preventing one or both of the lifters from slipping and falling during the lifting process.

Figure 6:
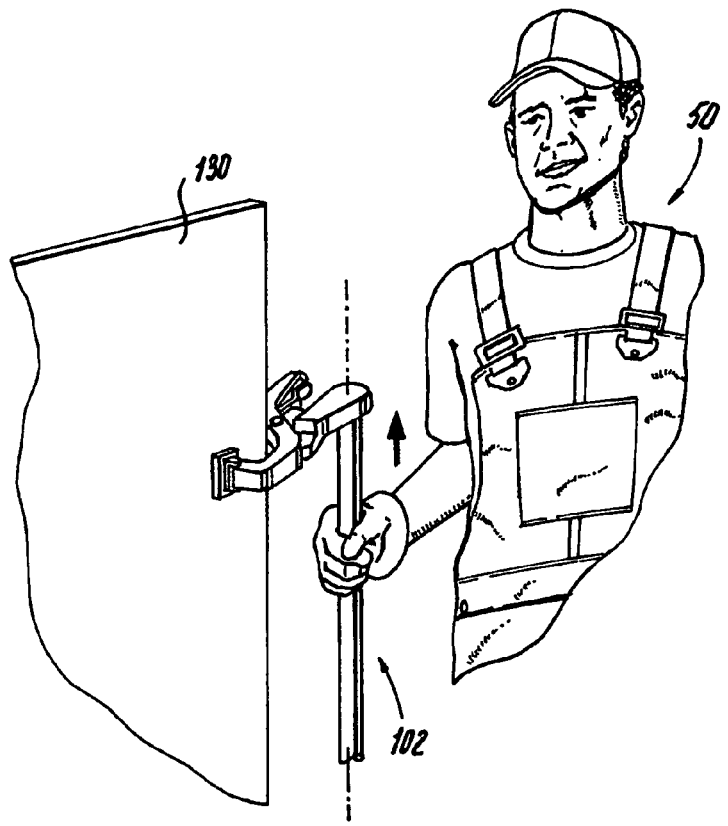
FIG. 6 is a perspective view of a person grasping a panel of plywood vertically using a quick-disconnect handle.

FIG. 6 shows workman 50 lifting a plywood panel 130 as grasped vertically by quick disconnect handle 102.

Figure 7:
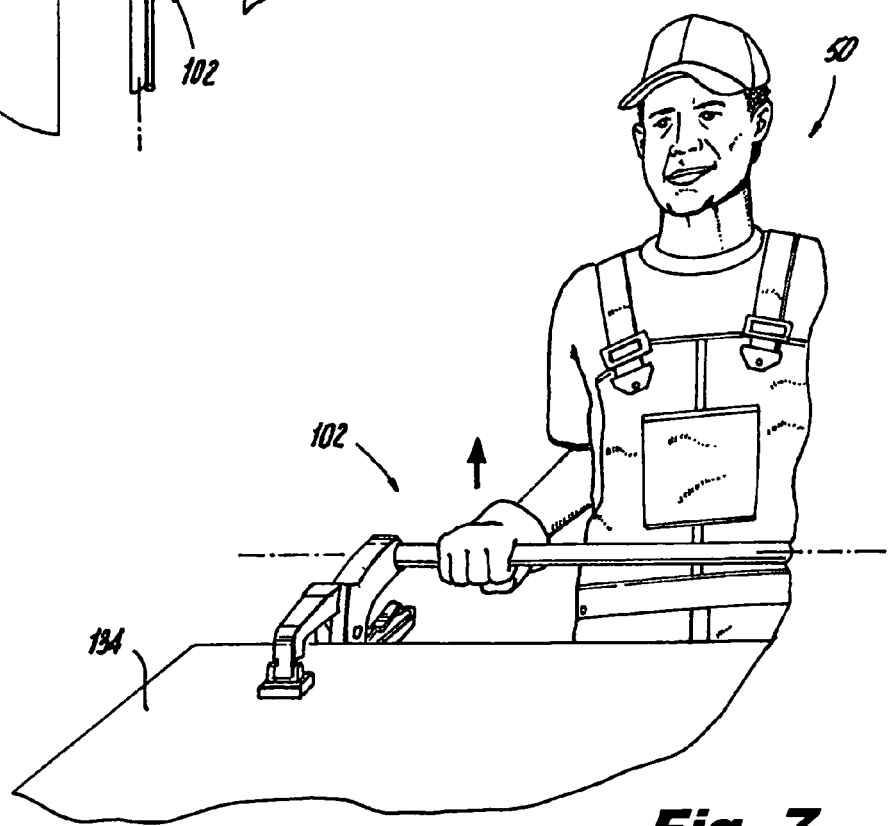
FIG. 7 is a perspective view of a person moving a tabletop horizontally using a quick-disconnect handle.

FIG. 7 illustrates the use of handle 102 in grasping and moving a tabletop 134 horizontally.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A combination wheelbarrow and quick-disconnect front handle of the wheelbarrow comprising: providing a second quick-disconnect wide handle removably attached to the front of the wheelbarrow having a bin to enable two users to quickly lift and dump the contents of a full wheelbarrow into a raised collection receptacle selected from the group consisting of a dumpster or a raised compost container; said quick-disconnect handle comprising
   - a pair of quick disconnect clamps having a ratcheting mechanism which reduces hand force to achieve high clamping pressure and a quick-release lever,
   - an elongated handle rod connected to a pair of said quick disconnect clamps at respective opposite ends thereof;
   - each said quick disconnect clamps engageable with a flat surface panel, whereby said elongated handle rod provides an elongated gripping surface for lifting said flat surface panel
   - said quick-disconnect handle being extended over and cantilevered outward from and being mountable on an outside front end panel of the wheelbarrow bin at an opposite end of the wheelbarrow bin from a rear handle assembly; said quick-disconnect handle providing a second lifting handle at a front end of said wheelbarrow opposite to the conventional pushing handle at a rear of said wheelbarrow;
   - said front mounted quick-disconnect handle having an equal height to that height of said rear conventional pushing handle assembly when said front quick-disconnect handle is at a deployed lifting height; said equal height of said front quick-disconnect handle and said rear conventional pushing handle assembly being both at a level close to the top of said wheelbarrow bin that is most useful for lifting and dumping;
   - said height of said front and said rear handles enabling two respective lifting users to have said respective front and rear handles at equal chest height when tipping the contents of said wheelbarrow cart into a raised collection receptacle.

2. The combination wheelbarrow and quick-disconnect front handle as in claim 1 wherein said elongated handle rod comprises two parts attached with a twist-lock sleeve at its center to facilitate length adjustment.

3. The combination wheelbarrow and quick-disconnect front handle as in claim 1 wherein each respective quick disconnect clamp further comprises one elongated operating handle having a rod attachment at a distal end thereof engageable with said elongated handle rod;
   - each said quick disconnect clamp having quick release levers releasing respective clamping pads from said flat panel surface upon manual squeezing thereof.

4. The combination wheelbarrow and quick-disconnect front handle as in claim 1 further comprising a height adjustment means, said means including a rotatable angled handle rod extension member; said rotatable handle rod extension member rotatable up or down;
   - each said clamp further having a further elongated clamp handle with an end being a fixed ratchet member matching with a matching rotatable ratchet member attached to each end of said rotatable angled rod extension member handle lockable in any position of rotation via a locking knob.

* * * * *